US007263488B2

(12) United States Patent
Chu et al.

(10) Patent No.: US 7,263,488 B2
(45) Date of Patent: Aug. 28, 2007

(54) METHOD AND APPARATUS FOR IDENTIFYING PROSODIC WORD BOUNDARIES

(75) Inventors: Min Chu, Beijing (CN); Yao Qian, Shanghai (CN)

(73) Assignee: Microsoft Corporation, Redmond, WA (US)

( * ) Notice: Subject to any disclaimer, the term of this patent is extended or adjusted under 35 U.S.C. 154(b) by 1065 days.

(21) Appl. No.: 09/850,526

(22) Filed: May 7, 2001

(65) Prior Publication Data

US 2002/0095289 A1 Jul. 18, 2002

Related U.S. Application Data

(60) Provisional application No. 60/251,167, filed on Dec. 4, 2000.

(51) Int. Cl.
*G10L 15/04* (2006.01)

(52) U.S. Cl. ...................................... 704/251; 704/252

(58) Field of Classification Search ........ 704/256-260, 704/267, 251-253
See application file for complete search history.

(56) References Cited

U.S. PATENT DOCUMENTS

| | | | | |
|---|---|---|---|---|
| 5,146,405 | A | 9/1992 | Church | 704/9 |
| 5,384,893 | A * | 1/1995 | Hutchins | 704/267 |
| 5,592,585 | A * | 1/1997 | Van Coile et al. | 704/206 |
| 5,727,120 | A * | 3/1998 | Van Coile et al. | 704/206 |
| 5,732,395 | A * | 3/1998 | Silverman et al. | 704/260 |
| 5,839,105 | A * | 11/1998 | Ostendorf et al. | 704/256 |
| 5,890,117 | A * | 3/1999 | Silverman | 704/260 |
| 5,905,972 | A | 5/1999 | Huang et al. | 704/268 |
| 6,064,960 | A | 5/2000 | Bellegarda et al. | |
| 6,076,060 | A * | 6/2000 | Lin et al. | 704/260 |
| 6,101,470 | A * | 8/2000 | Eide et al. | 704/260 |
| 6,185,533 | B1 * | 2/2001 | Holm et al. | 704/267 |
| 6,230,131 | B1 | 5/2001 | Kuhn et al. | 704/266 |
| 6,401,060 | B1 * | 6/2002 | Critchlow et al. | 704/1 |
| 6,499,014 | B1 * | 12/2002 | Chihara | 704/260 |
| 6,665,641 | B1 | 12/2003 | Coorman et al. | 704/260 |
| 6,708,152 | B2 * | 3/2004 | Kivimaki | 704/260 |
| 6,751,592 | B1 | 6/2004 | Shiga | 704/258 |
| 6,829,578 | B1 * | 12/2004 | Huang et al. | 704/211 |
| 7,010,489 | B1 * | 3/2006 | Lewis et al. | 704/260 |
| 2002/0072908 | A1 * | 6/2002 | Case et al. | 704/260 |

(Continued)

FOREIGN PATENT DOCUMENTS

EP 0 984 426 3/2000

OTHER PUBLICATIONS

Wang et al. "Tree-Based Unit Selecion for English Speech Synthesis," ICASSP'93, vol. 2, pp. 191-194 (1993).*

(Continued)

*Primary Examiner*—Michael N Opsasnick
(74) *Attorney, Agent, or Firm*—Theodore M. Magee; Westman, Champlin & Kelly, P.A.

(57) ABSTRACT

A method and computer-readable medium are provided that identify prosodic word boundaries for a text. If the text is unsegmented, it is first segmented into lexical words. The lexical words are then converted into prosodic words using an annotated lexicon to divide large lexical words into smaller words and a model to combine the lexical words and/or the smaller words into larger prosodic words. The boundaries of the resulting prosodic words are used to set the prosody for the synthesized speech.

27 Claims, 7 Drawing Sheets

U.S. PATENT DOCUMENTS

| | | | | |
|---|---|---|---|---|
| 2002/0103648 | A1* | 8/2002 | Case et al. | 704/260 |
| 2002/0152073 | A1* | 10/2002 | DeMoortel et al. | 704/260 |

OTHER PUBLICATIONS

Huang, X., Luo, Z. and Tang, J., "A Quick Method for Chinese Word Segmentation," Intelligent Processing Systems, vol. 2, pp. 1773-1776 (1997).

Wong, P. and Chan, C., "Chinese Word Segmentation Based on Maximum Matching and Word Binding Force," COLING'96, Copenhagen (1996).

Wang, W.J., Campbell, W.N., Iwahashi, N. and Sagisaka, Y., "Tree-Based Unit Selection for English Speech Synthesis," ICASSP'93, vol. 2, pp. 191-194 (1993).

Hon, H., Acero, A., Huang, S., Liu, J. and Plumpe, M., "Automated Generation of Synthesis Units for Trainable Text-to-Speech Systems," ICASSP'98, vol. 1, pp. 293-296 (1998).

Black, A. and Campbell, N., "Unit Selection in a Concatentaive Speech Synthesis System Using a Large Speech Database," ICASSP'96, pp. 373-376 (1996).

Chu, M., Tang, D., Si, H., Tian, Z. and Lu, S., "Research on Perception of Juncture Between Syllables in Chinese," Chinese Journal of Acoustics, vol. 17, No. 2, pp. 143-152.

Huang X et al., "Recent Improvements on Microsoft's Trainable Text-To-Speech System-Whistler," Acoustics, Speech and Signal Processing, 1997, pp. 959-962.

Hunt A et al., "Unit Selection in a Concatenative Speech Synthesis System Using a Large Speech Database," IEEE International Conference on Acoustics, Speech and Signal Processing, 1996, pp. 373-376.

Tien Ying Fung et al., "Concatenating Syllables for Response Generation in Spoken Language Applications," IEEE International Conference on Acoustics, Speech and Signal Processing, 2000, pp. 933-936.

Fu-Chiang Chou et al., "A Chinese Text-To-Speech System Based on Part-of-Speech Analysis, Prosodic Modeling and Non-Uniform Units," Acoustics, Speech, and Signal Processing, 1997, pp. 923-926.

Bigorgne D. et al., "Multilingual PSOLA Text-To-Speech System," Statistical Signal and Array Processing, Proceedings of the International Conference on Acoustics, Speech, and Signal Processing, 1993, pp. 187-190.

Nakajima S et al., "Automatic Generation of Synthesis Units Based on Context Oriented Clustering," International Conference on Acoustics, Speech and Signal Processing, 1988, pp. 659-662.

Black A W et al. "Optimising Selection of Units from Speech Databases for Concatenative Synthesis," 4th European Conference on Speech Communication and Technology Eurospeech, 1995, pp. 581-584.

European Search Report Application No. EP 01 12 8765.

P.B. Mareuil and B. Soulage, "Input/output normalization and linguistic analysis for a multilingual text-to-speech Synthesis System," Proc. of 4th ISCA workshop on speech synthesis, Scotland, 2001.

http://www.research.att.com/projects/tts/.

D.H. Klatt, "The Klattalk text-to-speech conversion system," Proc. of ICASSP '82, pp. 1589-1592, 1982.

H. Fujisaki, K. Hirose, N. Takahashi and H. Morikawa, "Acoustic characteristics and the underlying rules of intonation of the common Japanese used by radio and TV announcers," *Proc. of ICASSP '86*, pp. 2039-2042, 1986.

K.N. Ross and M. Ostendorf, "A dynamical system model for generating fundamental frequency for speech synthesis," IEEE transactions on speech and audio processing, vol. 7, No. 3, pp. 295-309, 1999.

J.R. Bellegarda, K. Silverman, K. Lenzo, and V. Anderson, "Statistical prosodic modeling: from corpus design to parameter estimation," IEEE transactions on speech and audio processing, vol. 9, No. 1, pp. 52-66, 2001.

S. Chen, S. Hwang and Y. Wang, "An RNN-based prosodic information synthesizer for Mandarin text-to-speech," IEEE transactions on speech and audio processing, vol. 6, No. 3, pp. 226-239, 1998.

M. Chu, H. Peng, H. Yang and E. Chang, "Selecting non-uniform units from a very large corpus for concatenative speech synthesizer," *Proc. of ICASSP '2001, Salt Lake City*, 2001.

E. Moulines and F. Charpentier, "Pitch-Synchronous Waveform Processing Techniques for Text-to-Speech Synthesis Using Diphones," Speech Communication vol. 9, pp. 453-467, 1990.

Y. Stylianou, T. Dutoit, and J. Schroeter, "Diphone concatenation using a harmonic plus noise model of speech," Proc. Of Eurospeech '97, pp. 613-616, Rhodes, 1997.

M. Chu, H. Peng, H. Yang and E. Chang, "Selecting non-uniform units from a very large corpus for concatenative speech synthesizer," Proc. of ICASSP '2001, Salt Lake City, 2001.

X.D. Huang, A. Acero, J. Adcock, et al., "Whistler: a trainable text-to-speech system," Proc. of 'ICSLP '96, Philadelphia, 1996.

R.E. Donovan and E.M. Eide, "The IBM Trainable speech synthesis system," Proc. of ICSLP '98, Sidney, 1998.

H. Peng, Y. Zhao and M. Chu, "Perpetually optimizing the cost function for unit selection in a TTS system with one single run of MOS evaluation," Proc. of ICSLP '2002, Denver, 2002.

M. Chu and H. Peng, "An objective measure for estimating MOS of synthesized speech," Proc. of Eurospeech '2001, Aalborg, 2001.

http://www.microsoft.com/speech/techinfo/compliance/.

* cited by examiner

METHOD AND APPARATUS FOR IDENTIFYING PROSODIC WORD BOUNDARIES

REFERENCE TO RELATED APPLICATION

The present application claims priority to a U.S. Provisional application having Ser. No. 60/251,167, filed on Dec. 4, 2000 and entitled "PROSODIC WORD SEGMENTATION AND MULTI-TIER NON-UNIFORM UNIT SELECTION".

BACKGROUND OF THE INVENTION

The present invention relates to speech synthesis. In particular, the present invention relates to setting prosody in synthesized speech.

Text-to-speech systems have been developed to allow computerized systems to communicate with users through synthesized speech. To produce natural sounding speech, prosodic contours such as fundamental frequency, duration, amplitude and pauses must be generated for the synthesized speech to provide the proper cadence. In many languages, lexical word boundaries provide cues for generating prosodic contours.

For Asian languages, such as Chinese, Japanese and Korean, generating prosodic contours in an utterance is complicated by the fact that the lexical word boundaries in these languages are not apparent from the text. Unlike Western languages such as English, where characters are grouped into words separated by spaces, Asian languages are written in strings of unsegmented single characters. Thus, even multi-character words appear as unsegmented single characters.

In the prior art, efforts were made to improve the cadence or prosody of Asian text-to-speech systems by improving the segmentation of the characters into individual lexical words. However, the resulting speech has not been as natural as desired.

SUMMARY OF THE INVENTION

A method and computer-readable medium are provided that identify prosodic word boundaries for an unrestricted text. If the text is unsegmented, it is segmented into lexical words. The lexical words are then converted into prosodic words using an annotated lexicon to divide large lexical words into smaller words and a model to combine the lexical words and/or the smaller words into larger prosodic words. The boundaries of the resulting prosodic words are used to set prosodic contours for the synthesized speech.

DETAILED DESCRIPTION OF ILLUSTRATIVE EMBODIMENTS

Figure 1:
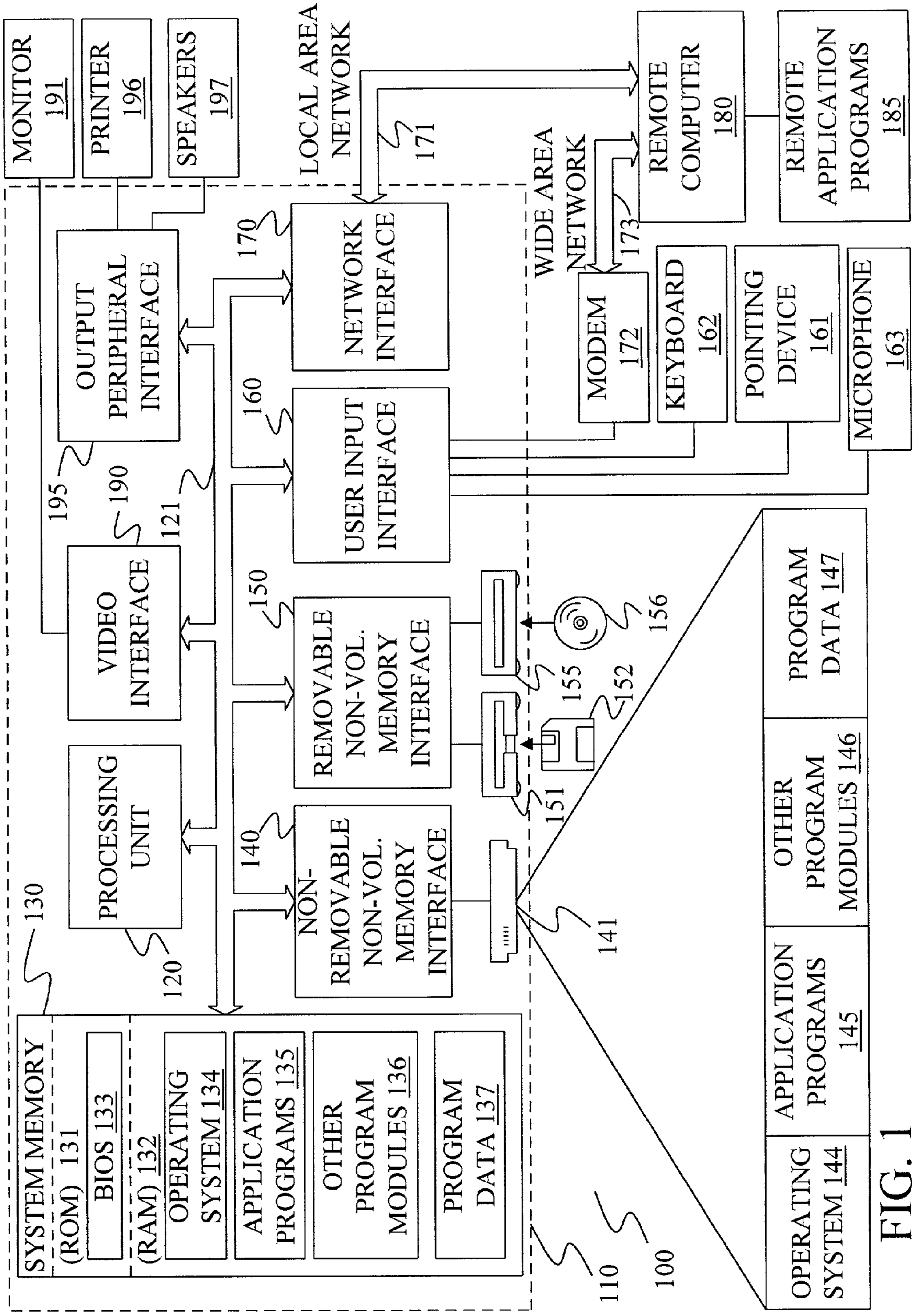
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
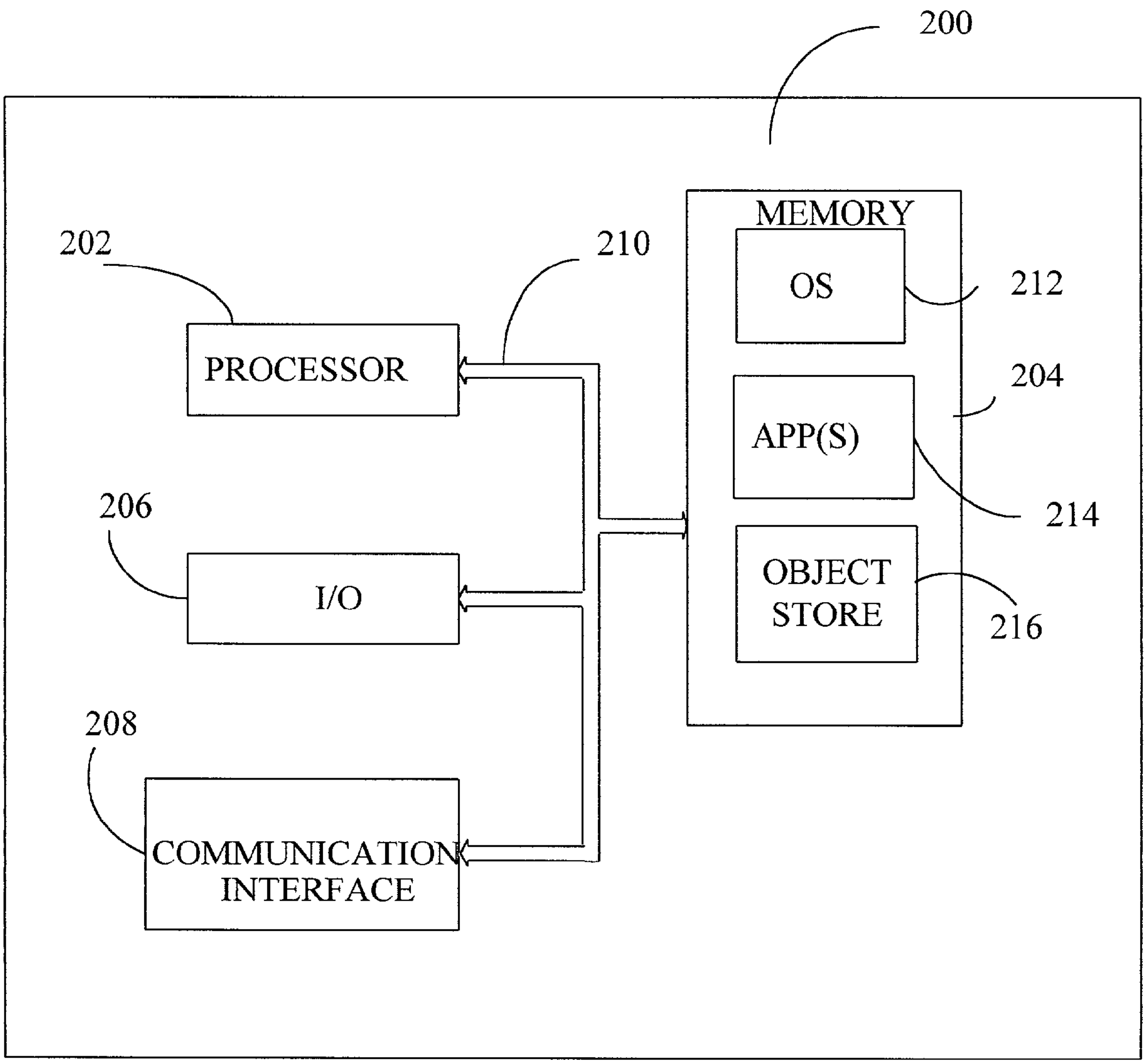
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
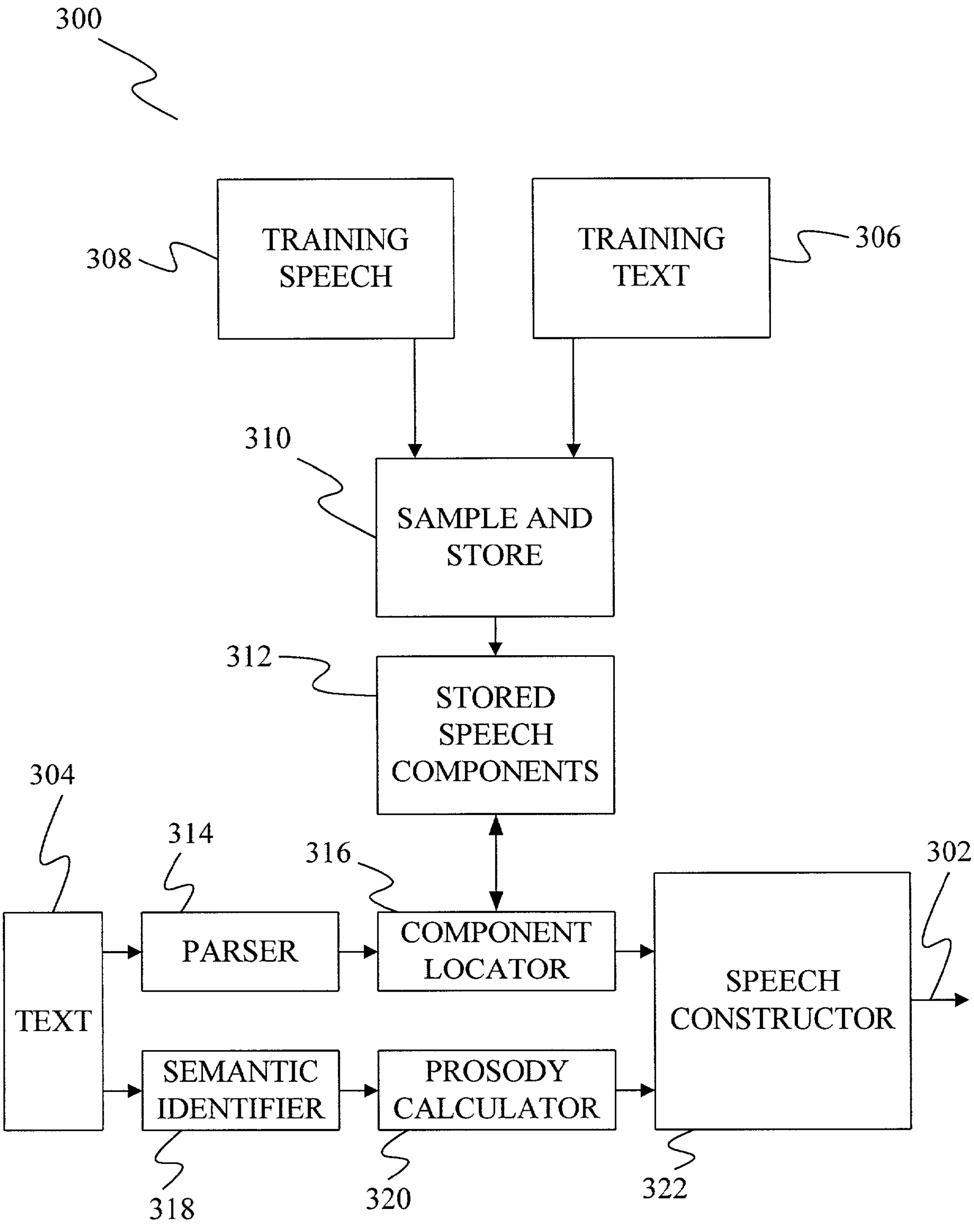
FIG. 3 is a block diagram of a speech synthesis system.

FIG. 3 is a block diagram of a speech synthesizer 300 that is capable of constructing synthesized speech 302 from an input text 304. Before speech synthesizer 300 can be utilized to construct speech 302, samples of training text must be stored. This is accomplished using a training text 306 that is read into speech synthesizer 300 as training speech 308.

A sample and store circuit 310 breaks training speech 308 into individual speech units such as phonemes, diphones, triphones or syllables based on training text 306. Sample and store circuit 310 also samples each of the speech units and stores the samples as stored speech components 312 in a memory location associated with speech synthesizer 300.

In many embodiments, training text 306 includes over 10,000 words. As such, not every variation of a phoneme, diphone, triphone or syllable found in training text 306 can be stored in stored speech components 312. Instead, in most embodiments, sample and store 310 selects and stores only a subset of the variations of the speech units found in training text 306. The variations stored can be actual variations from training speech 308 or can be composites based on combinations of those variations.

Once training samples have been stored, input text 304 can be parsed into its component speech units by parser 314. The speech units produced by parser 314 are provided to a component locator 316 that accesses stored speech units 312 to retrieve the stored samples for each of the speech units produced by parser 314. In particular, component locator 316 examines the neighboring speech units around a current speech unit of interest and based on these neighboring units, selects a particular variation of the speech unit stored in stored speech components 312. Based on this retrieval process, component locator 316 provides a set of stored samples for each speech unit provided by parser 314.

Text 304 is also provided to a semantic identifier 318 that identifies the basic linguistic structure of text 304. In particular, semantic identifier 318 is able to distinguish questions from declarative sentences, as well as the location of commas and natural breaks or pauses in text 304.

Based on the semantics identified by semantic identifier 318, a prosody calculator 320 calculates the desired pitch and duration needed to ensure that the synthesized speech does not sound mechanical or artificial. In many embodiments, the prosody calculator uses a set of prosody rules developed by a linguistics expert. In other embodiments, statistical prosody rules are used.

Prosody calculator 320 provides its prosody information to a speech constructor 322, which also receives retrieved samples from component locator 316. When speech constructor 322 receives the speech components from component locator 316, the components have their original prosody as taken from training speech 308. Since this prosody may not match the output prosody calculated by prosody calculator 320, speech constructor 322 must modify the speech components so that their prosody matches the output prosody produced by prosody calculator 320. Speech constructor 322 then combines the individual components to produce synthesized speech 302. Typically, this combination is accomplished using a technique known as overlap-and-add where the individual components are time shifted relative to each other such that only a small portion of the individual components overlap. The components are then added together.

As discussed in the background, prior art semantic identifiers identify groupings of characters that form lexical words in the text. These lexical words are then used by a prosodic calculator to calculate prosodic contours such as fundamental frequency, duration, amplitude and pauses.

The present inventors have discovered that this technique is not effective in many Asian languages because lexical word boundaries do not match well with the cadence of speech. Instead, the basic rhythm units sometimes form only part of a lexical word and at other times they span more than one lexical word. Such basic rhythm units are called prosodic words.

Unfortunately, such prosodic words are formed dynamically during speech and it is impossible to list all of them into a lexicon. The present invention provides a method and system for identifying the prosodic word boundaries in a text.

Under one embodiment of the present invention, a conversion model and an annotated lexicon are formed to identify lexical words that should be combined into a larger prosodic word and to identify lexical words that should be divided into smaller prosodic words.

Figure 4:
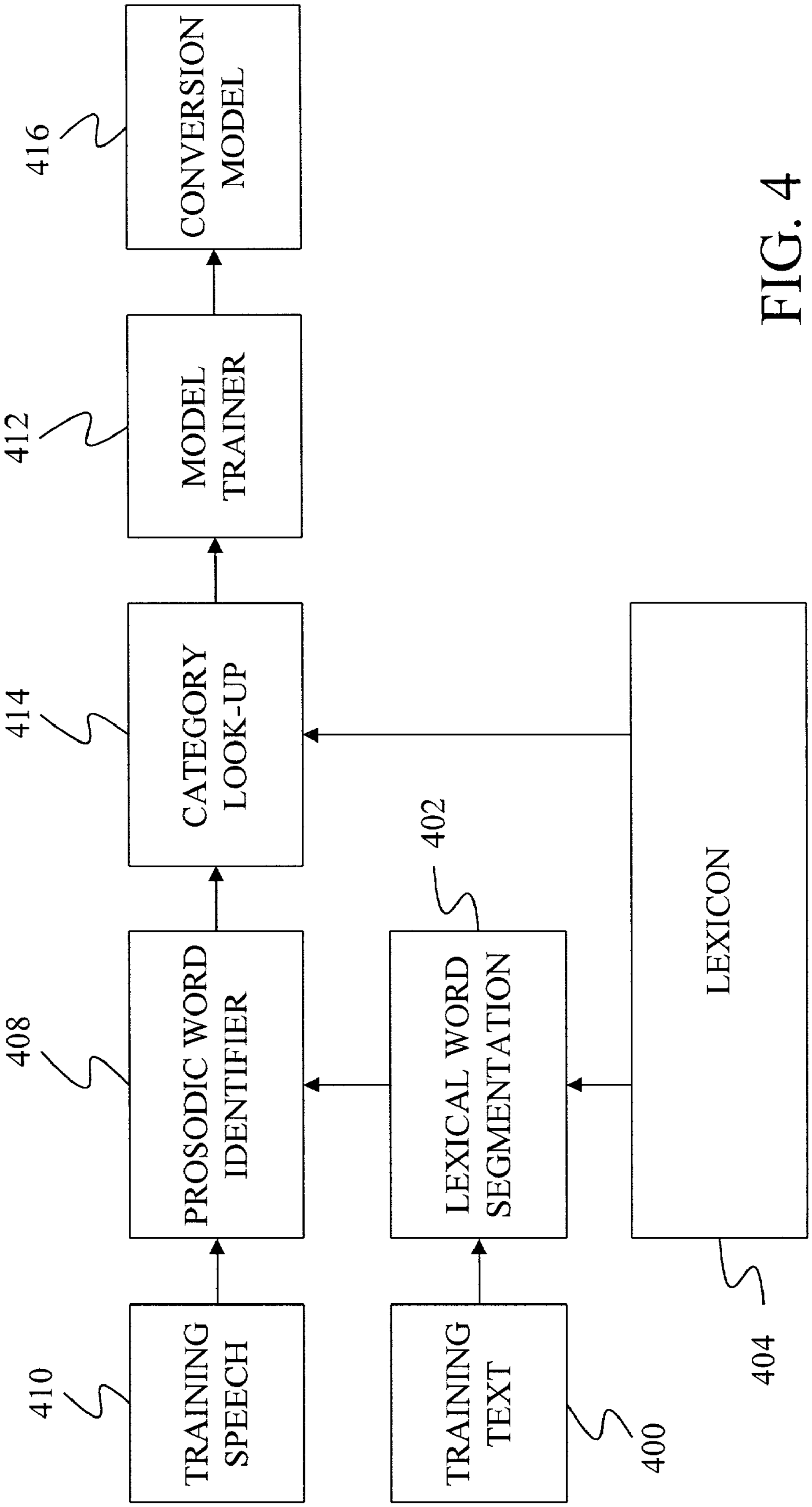
FIG. 4 is a block diagram of a system for training a lexical-to-prosodic conversion model.

FIG. 4 provides a block diagram of elements used to form or train the conversion model under embodiments of the present invention. In FIG. 4, if a training text 400 is not already segmented, it is first segmented into lexical words by a lexical segmentation unit 402 based on entries in a lexicon (sometimes referred to as a dictionary) 404. Such lexical segmentation units are well known in the art and are not described in detail here since any type of lexical segmentation unit may be used within the scope of the present invention.

The segmented training text is then provided to a prosodic word identifier 408 together with a training speech signal 410. In many embodiments, prosodic word identifier 408 is a panel of human listeners who listen to training speech signal 410 while reading the training text. Each member of the panel marks prosodic word boundaries that he perceived as a single rhythm unit. If a majority of the panel agrees on a prosodic word, a boundary mark is placed.

Once the training text has been annotated with the prosodic word boundaries, the annotated text is provided to a category look-up 414, which identifies a set of categories for each word in the training text. Under embodiments of the present invention, these categories include things such as the lexical word's part of speech in the text, the length of the lexical word, whether the lexical word is a proper name and other similar features of the lexical word. Under some embodiments, some or all of these features are stored in the entry for the lexical word in lexicon 404.

The words and their categories are passed to model trainer 412, which groups neighboring lexical words in the training text into word pairs and groups their corresponding categories into category pairs. The category pairs and the annotations indicating whether a pair of lexical words constitute a prosodic word are then used to train a conversion model 416.

Under one embodiment, conversion model 416 is a statistical model. To train this statistical model, model trainer 412 generates a count of the number of word pairs associated with each unique category pair in the training text. Thus, if four different word pairs formed the same category pair, that category pair would have a count of four. Model trainer 412 also generates a count of the number of lexical word pairs associated with a category pair that was marked as forming a prosodic word by prosodic word identifier 408. These counts are then used to produce a conditional probability described as:

$$\tilde{P}(T_0|P_i) = \frac{\text{count}(T_0|P_i)}{\text{count}(P_i)} \quad \text{EQ. 1}$$

where $\text{count}(P_1)$ is the number of lexical word pairs with category pair condition $P_i$, $\text{count}(T_0|P_1)$ is the number of lexical word pairs that form a single prosodic word and have category pair condition $P_i$, and $\tilde{P}(T_0|P_1)$ is the probability of a lexical word pair forming a prosodic word if the word pair has the category pair condition $P_i$.

When $\text{count}(P_1)$ is a small number, the estimated probability is not reliable. Under one embodiment, a weighted probability is used to reduce the contribution of unreliable probabilities. This weighted probability is defined as:

$$W\tilde{P}(T_0|P_1)=\tilde{P}(T_0|P_1)\times W(P_1) \quad \text{EQ.2}$$

where $W\tilde{P}(T_0|P_1)$ is the weighted probability and $W(P_1)$ is a weighting function. Under one embodiment, the weighting function is a sigmoid function of the form:

$$W(P_1)=\text{sigmoid}(1+\log(\text{count}(P_1))) \quad \text{EQ.3}$$

which has values between zero and one.

Under one embodiment, the weighted probabilities determined above are compared to a threshold to determine whether lexical words with a particular category pair condition will be designated as forming a prosodic word. If the probability is greater than the threshold for a category pair, lexical words with that category pair will be combined into a prosodic word by conversion model 416 when encountered during speech production. If the probability is less than the threshold, conversion model 416 will not combine the lexical word pair that forms that category pair into a prosodic word.

In other embodiments, conversion model 416 is a classification and regression tree (CART). Under this embodiment, a question list is defined for the conversion model. The classification and regression tree then applies the questions to the category pairs to group the category pairs and their associated lexical word pairs into nodes. The lexical word pairs in each node are then examined to determine how many of the lexical word pairs were designated by prosodic word identifier 408 as forming a prosodic word. Nodes with relatively large numbers of word pairs that form prosodic words are then designated as prosodic nodes while nodes with relatively few word pairs that form prosodic words are designated as non-prosodic nodes.

When the CART model receives text during speech synthesis, it applies the category pairs to the questions in the model and identifies the node for the category pair. If the node is a prosodic node, the lexical words associated with the category pair are combined into a prosodic word. If the node is a non-prosodic node, the lexical words are kept separate.

Figure 5:
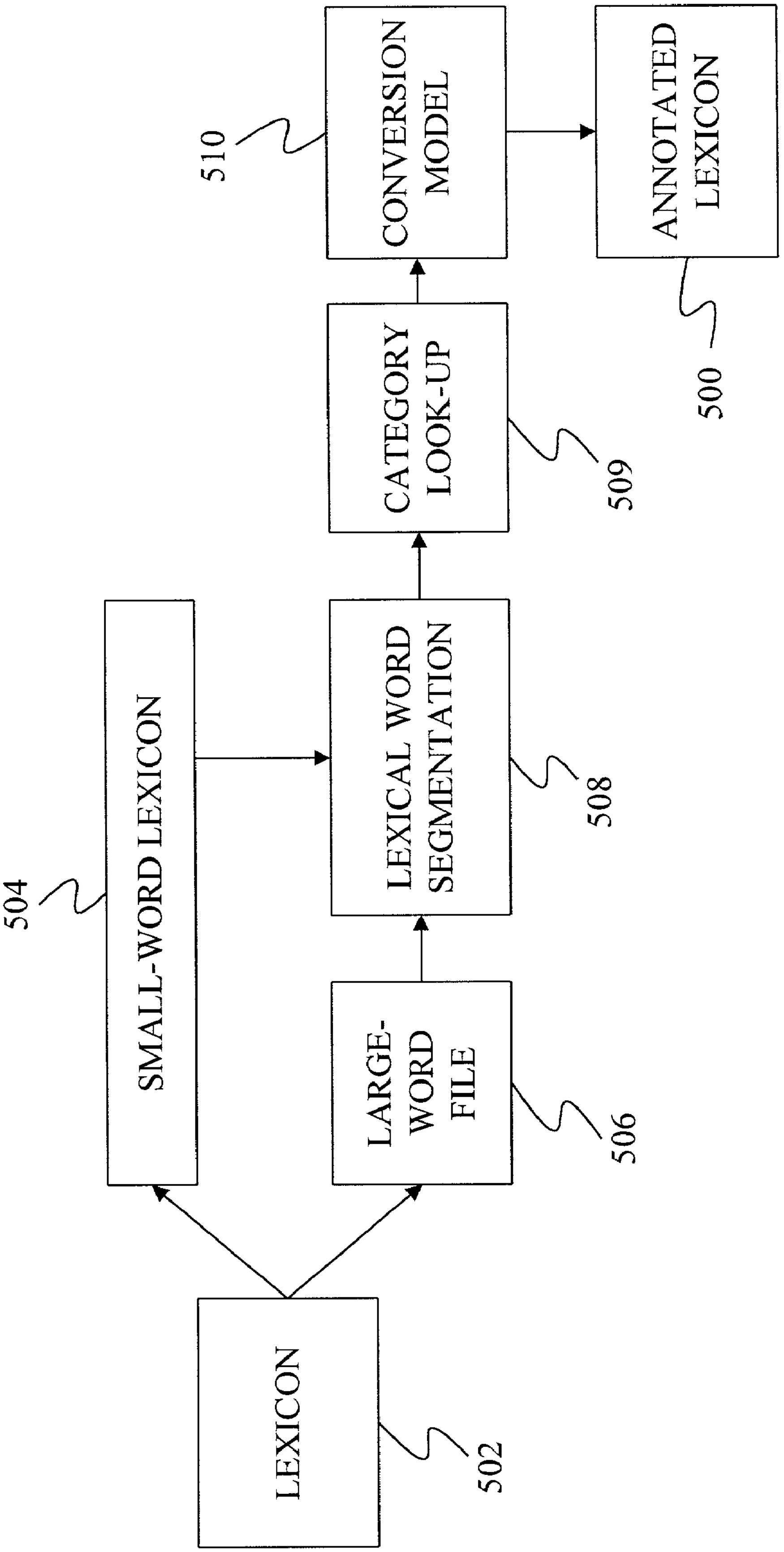
FIG. 5 is a block diagram of a system for forming an annotated lexicon that can be used to divide lexical words into prosodic words.

FIG. 5 provides a block diagram of elements used to form an annotated lexicon 500 that describes how larger lexical words are to be divided into smaller prosodic words. In FIG. 5, a lexicon 502 is divided into a small-word lexicon 504 and a large-word file 506. In most embodiments, the division is made based on the number of characters in the word. For example, under one embodiment, small word lexicon 504 contains words with fewer than four characters while large word file 506 contains words with at least four characters.

Each word in large-word file 506 is applied to lexical word segmentation unit 508. Lexical word segmentation unit 508 is similar to segmentation unit 402 of FIG. 4 except that it utilizes small-word lexicon 504 as its lexicon instead of the entire lexicon. Because of this, segmentation unit 508 will divide the large words of large-word file 506 into combinations of smaller words that exist in small-word lexicon 504.

The smaller lexical words identified by segmentation unit 508 are applied to a category look-up 509, which is similar to category look-up 414 of FIG. 4. Category look-up 414 identifies a set of categories for each word and provides the smaller lexical words and their categories to conversion model 510, which is the same as conversion model 416 of FIG. 4. Conversion model 510 groups the categories of neighboring lexical words into category pairs and uses the category pairs to identify which pairs of smaller lexical words would be pronounced as a single prosodic word.

Thus, a four-character word may be divided into a two-character word followed by two one-character words by segmentation unit 508. The two one-character words may then be combined into a single prosodic word by conversion model 510.

Lexicon 502 is then annotated to form annotated lexicon 500 by indicating how the larger lexical words should be divided into smaller prosodic words. In particular, the output of conversion model 510 indicates how each larger word should be divided. Thus, in the example above, the four-character word's entry would be annotated to indicate that it should be divided into two two-character prosodic words.

Figure 6:
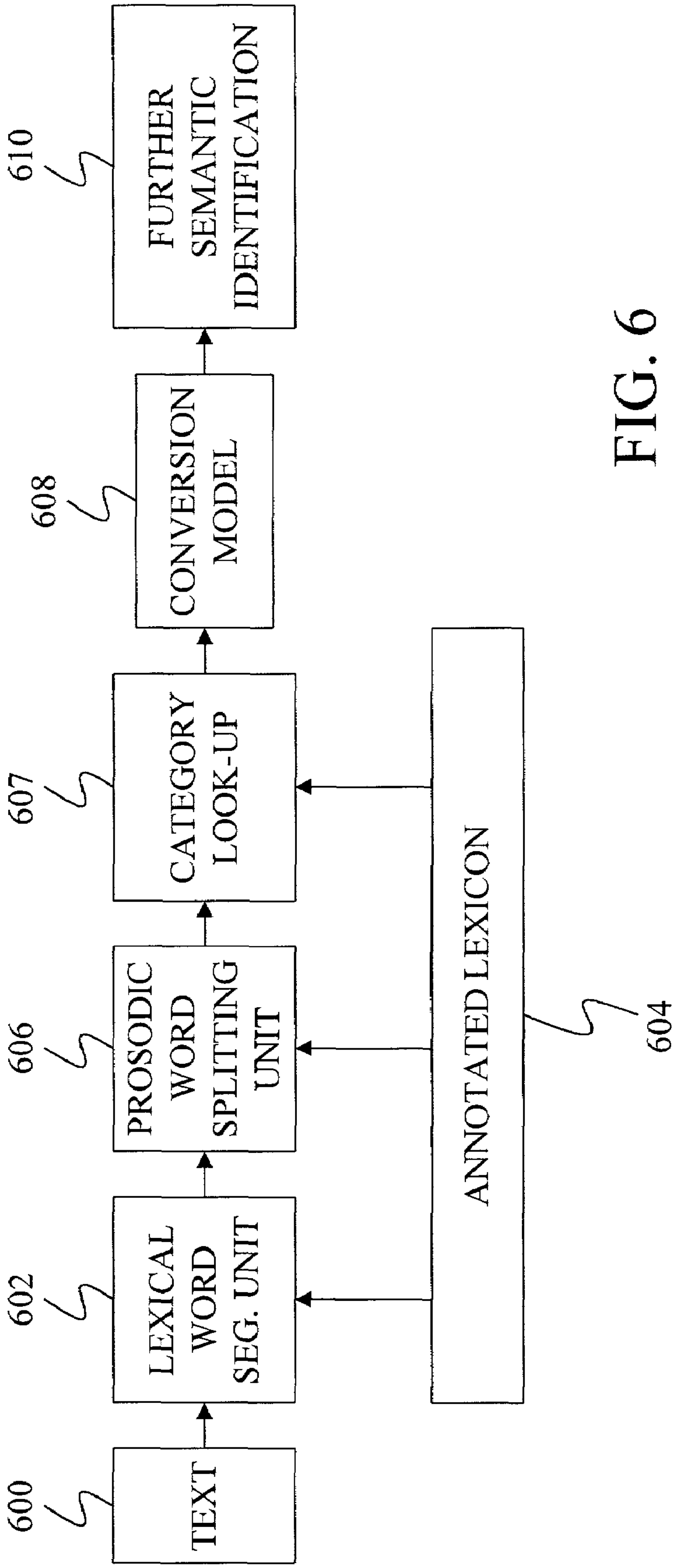
FIG. 6 is a block diagram of a system for converting unsegmented text into prosodic words.
Figure 7:
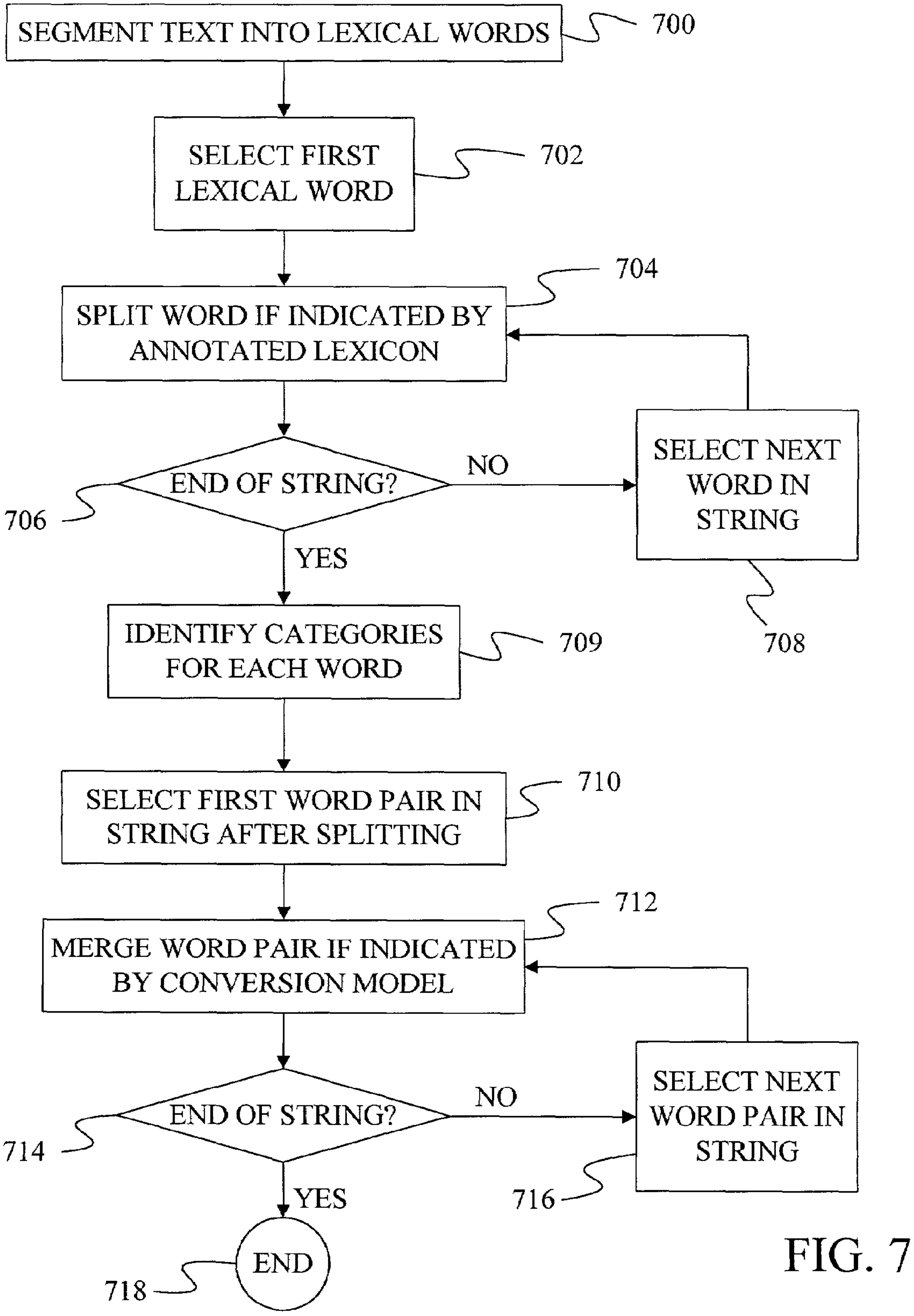
FIG. 7 is a flow diagram of a method of converting unsegmented text into prosodic words.

Once the annotated lexicon and the conversion model have been formed, they can be used to identify prosodic words during speech synthesis. FIGS. 6 and 7 provide a block diagram and a flow diagram showing how prosodic words are identified under embodiments of the present invention.

At step 700 of FIG. 7, if a text 600 for synthesis is not already segmented into lexical words, it is segmented into lexical words by a lexical word segmentation unit 602 using annotated lexicon 604. In FIG. 6, segmentation unit 602 is the same as segmentation unit 402 of FIG. 4 and annotated lexicon 604 is the same as annotated lexicon 500 of FIG. 5.

The first lexical word identified by segmentation unit 602 is selected at step 702 and is provided to splitting unit 606. At step 704, splitting unit 606 segments the lexical word into smaller prosodic words as indicated by annotated lexicon 604. If annotated lexicon 604 indicates that the lexical word is not to be divided, the word is left intact by splitting unit 606.

At step 706, splitting unit 606 determines if this is the last lexical word in the string. If it is not the last lexical word, it stores the present lexical word or the prosodic words formed from the lexical word and selects the next word in the string at step 708. The process of FIG. 7 then returns to step 704.

Steps 704, 706, and 708 are repeated until the last lexical word in the string has been processed by prosodic segmentation unit 606. When the last word has been processed, all of the stored words are passed to category look-up 607 as a modified or intermediate string of words.

Category look-up 607 is similar to category look-up 414 of FIG. 4. At step 709, category look-up 607 identifies a set of categories for each word generated by splitting unit 606. Category look-up 607 then provides the modified string of words from splitting unit 606 to conversion model 608 along with the categories of each word.

At step 710, conversion model 608 selects the first word pair in the modified string of words. This word pair may be formed of two lexical words from text 600, a lexical word and a smaller prosodic word, or two smaller prosodic words. Based on the model parameters and the category pair formed from the set of categories for the two words in the word pair, conversion model 608 determines whether to merge the two words together to form a prosodic word at step 712. If the model indicates that the two words would be pronounced as a single rhythm unit, the words are combined into a single prosodic word. If the model indicates that the words would be pronounced as two rhythm units, the words are left separated.

At step 714, conversion model 608 determines if this is the last word pair in the string. If this is not the last word pair, the next word pair is selected at step 716. Under most embodiments, the next word pair consists of the last word in the current word pair and the next word in the string. If a single prosodic word was formed at step 712, the next word pair consists of the prosodic word and the next word in the string. The process of FIG. 7 then returns to step 712 to determine if the current word pair should be combined as a single prosodic word.

Steps 712, 714, and 716 are repeated until the end of the string is reached. The process then ends at step 718 and the modified string is provided to further components 610 that perform the remainder of the semantic identification. This includes such things as determining the sentence construction and using the sentence construction and the prosodic word boundaries to identify pitch contour, duration and pauses or other high level description features such as word initial, word middle or word end. Note that by using prosodic word boundaries to identify these prosodic features, the present invention is thought to provide more natural sounding speech for text, especially Asian text.

Although the prosodic word identification system of the present invention was described above in the context of speech synthesis, the system can also be used to label a training corpus with prosodic word boundaries. Thus, instead of being used directly to identify prosody for a text to be synthesized, the prosodic word identification process can be used to identify prosodic words in a large corpus.

Although the present invention has been described with reference to particular embodiments, workers skilled in the art will recognize that changes may be made in form and detail without departing from the spirit and scope of the invention.

What is claimed is:

1. A method of identifying prosody for a synthesized speech segment that is formed from a string of lexical words, the method comprising:

converting the string of lexical words into a string of prosodic words through steps comprising dividing at least one lexical word into smaller prosodic words, each prosodic word comprising at least one lexical word and the string of prosodic words having different word boundaries than the string of lexical words; and identifying the prosody from the string of prosodic words.

2. The method of claim 1 wherein dividing a lexical word into smaller prosodic words comprises accessing an annotated lexicon to determine how to divide the lexical word into smaller prosodic words.

3. The method of claim 1 wherein converting the string of lexical words into a string of prosodic words further comprises:

dividing at least one lexical word in the string of lexical words into smaller prosodic words to form a modified string; and combining at least two words in the modified string into a prosodic word.

4. The method of claim 1 wherein identifying the prosody from the string of prosodic words comprises identifying at least one prosodic feature from the set of prosodic features consisting of pitch contour, duration, pauses, word initial, word middle and word end.

5. The method of claim 1 wherein converting the string of lexical words into a string of prosodic words further comprises concatenating at least two lexical words in the string of lexical words to form a prosodic word in the string of prosodic words.

6. The method of claim 5 wherein combining at least two lexical words comprises:

identifying at least one category for each lexical word; and determining whether to concatenate the two lexical words based on the categories of the lexical words.

7. The method of claim 6 wherein determining whether to concatenate the two lexical words comprises applying the categories of the lexical words to a classification and regression tree.

8. The method of claim 6 wherein determining whether to concatenate the two lexical words comprises examining a probability that describes the likelihood that the lexical words form a prosodic word given the categories.

9. A method of training a model for converting a string of lexical words into a string of prosodic words, the method comprising:

annotating a text comprising the string of lexical words with prosodic word boundaries based on a training speech signal produced by the recitation of the string of lexical words;

determining that a pair of lexical words forms a single prosodic word based on the prosodic word boundary annotations;

identifying categories for the pair of lexical words; and training the model based on the determination that the pair of lexical words forms a single prosodic word and the categories for the pair of lexical words.

10. The method of claim 9 wherein training the model comprises training a classification and regression tree.

11. The method of claim 9 wherein training the model comprises training a statistical model.

12. The method of claim 11 wherein training a statistical model comprises:

identifying a set of categories for each pair of lexical words in the strings of lexical words;

producing a category count for each set of categories by counting the number of pairs of lexical words for which the set of categories was identified;

producing a prosodic word count for each set of categories by counting the number of pairs of lexical words that were determined to form a single prosodic word and for which the set of categories was identified; and using the prosodic word count and the category count to train the statistical model.

13. The method of claim 12 further comprising using a weighting function with the prosodic word count and the category count to train the statistical model.

14. The method of claim 13 wherein the weighting function gives preference to sets of categories that have a high category count.

15. The method of claim 9 further comprising annotating a lexicon to indicate how to divide at least one lexical word into multiple prosodic words.

16. The method of claim 15 wherein annotating a lexicon comprises:

removing words with more than a selected number of characters from a lexicon to form a short-word lexicon; and segmenting each removed word based on words in the short-word lexicon to produce smaller words.

17. The method of claim 16 wherein annotating the lexicon further comprises:

combining at least some of smaller words to form combined words, the combined words and the smaller words that are not combined forming prosodic words; and annotating the lexicon based on the prosodic words.

18. The method of claim 17 wherein combining at least some of the smaller words comprises using the model to convert the smaller words into combined words.

19. A computer-readable storage medium storing computer-executable instructions for causing a computer to perform steps comprising:

identifying lexical words in a string of characters;

identifying prosodic words from the lexical words by concatenating at least two lexical words on the basis of a model wherein concatenating at least two lexical words on the basis of a model comprises:

determining at least one category for each lexical word;

applying the categories to the model to determine whether to concatenate the lexical words into a prosodic word; and using the prosodic words when setting the prosody for synthesized speech formed from the string of characters.

20. The computer-readable storage medium of claim 19 wherein the model comprises a statistical model.

21. The computer-readable storage medium of claim 19 wherein the model comprises a classification and regression tree.

22. The computer-readable storage medium of claim 19 wherein the step of identifying prosodic words comprises:

dividing at least one lexical word into at least two prosodic words and replacing the lexical word with the prosodic words to form an intermediate string of words comprising at least one of the lexical words identified from the string of characters and the at least two prosodic words; and combining at least two words in the intermediate string of words to form a prosodic word.

23. The computer-readable storage medium of claim 19 further comprising identifying prosodic words by dividing a lexical word into at least two prosodic words.

24. The computer-readable storage medium of claim 23 wherein dividing a lexical word comprises:

accessing a lexicon to find an entry for the lexical word;

retrieving information from the entry describing how the lexical word is to be divided; and dividing the lexical word based on the information.

25. A method of identifying prosody for a synthesized speech segment that is formed from a string of lexical words, the method comprising:

converting the string of lexical words into a string of prosodic words by concatenating at least two lexical words in the string of lexical words to form a prosodic word, each prosodic word comprising at least one lexical word and the string of prosodic words having different word boundaries than the string of lexical words, wherein concatenating the two lexical words comprises:

identifying at least one category for each lexical word; and determining whether to concatenate the two lexical words based on the categories of the lexical words; and identifying the prosody from the string of prosodic words.

26. The method of claim 25 wherein determining whether to concatenate the two lexical words comprises applying the categories of the lexical words to a classification and regression tree.

27. The method of claim 25 wherein determining whether to concatenate the two lexical words comprises examining a probability that describes the likelihood that the lexical words form a prosodic word given the categories.

* * * * *